B. A. JOHNSON.
BRAKE SHOE.
APPLICATION FILED JULY 1, 1913.
1,081,046.
Patented Dec. 9, 1913.
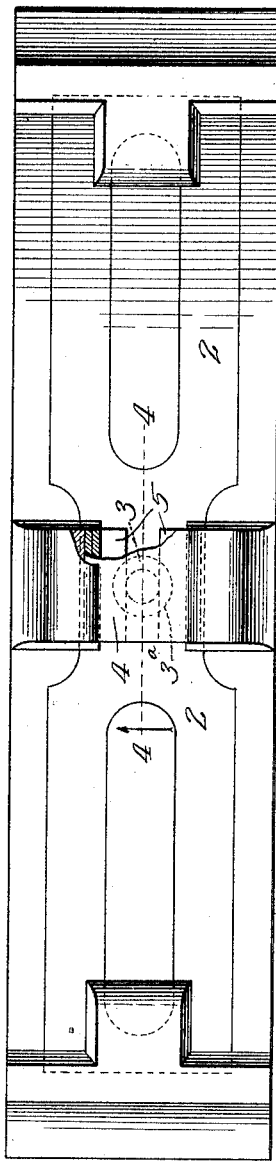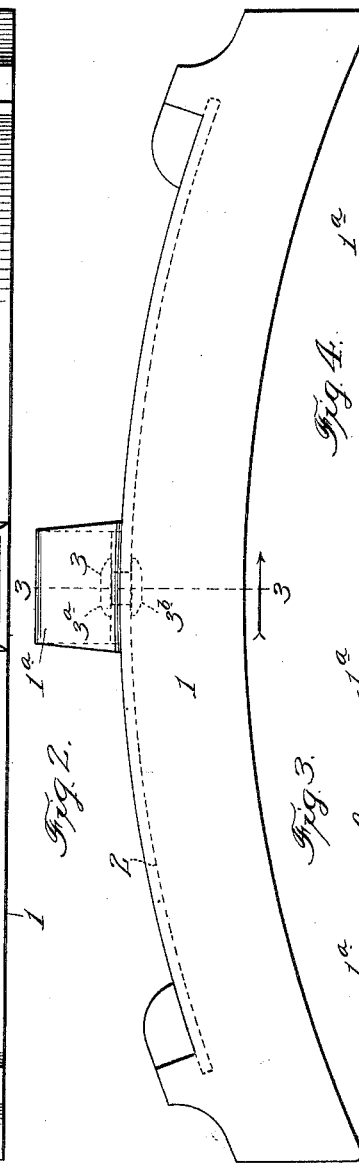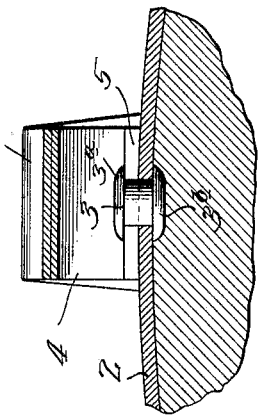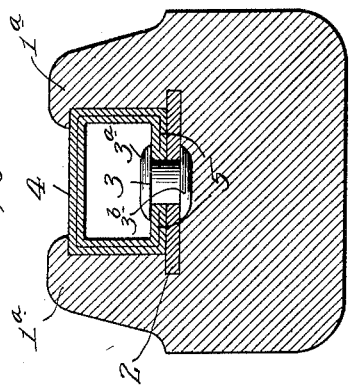
Witnesses:
Chas. H. Buell.
Irwin C. Bowman.
Inventor:
Benjamin A. Johnson
By Price Fisher & Clapp
Attys.

UNITED STATES PATENT OFFICE.

BENJAMIN A. JOHNSON, OF CHICAGO, ILLINOIS.

BRAKE-SHOE.

1,081,046. Specification of Letters Patent. Patented Dec. 9, 1913.

Application filed July 1, 1913. Serial No. 776,769.

*To all whom it may concern:*

Be it known that I, BENJAMIN A. JOHNSON, a citizen of the United States, residing in Chicago, in the county of Cook and State of Illinois, have invented certain new and useful Improvements in Brake-Shoes, of which I do declare the following to be a full, clear, and exact description, reference being had to the accompanying drawing, forming a part of this specification.

My present invention has relation, more particularly, to that class of brake shoes in which provision is made for securing the brake shoe to the brake head by providing the shoe with a ductile metal fastening lug.

The invention consists of the features of novelty hereinafter described, illustrated in the accompanying drawing and particularly pointed out in the claims at the end of this specification.

Figure 1 is a plan view, and Fig. 2 is a view in side elevation, of a brake shoe embodying my invention. Fig. 3 is a view in cross section on lines 3—3 of Fig. 2. Fig. 4 is a view in longitudinal section on line 4—4 of Fig. 1.

In the accompanying drawing, 1 designates the body of the brake shoe, that may be formed, as usual, of cast metal, and 2 designates the reinforcing ductile metal back or back plate of the shoe.

The body of the brake shoe may be of any suitable shape, and the reinforcing back 2 may be of any of the familiar forms, such for example, as are now commonly used for strengthening or reinforcement of the shoe.

To the back 2 of the brake shoe is connected, as by a rivet or pin 3, the ductile metal fastening lug 4. Preferably, this ductile metal fastening lug is formed from a tubular bar that is first flattened and thereafter bent to give a rectangular shape to the lug 4, the bottom walls 5 of the lug 4 being preferably separated a distance corresponding to the diameter of the body portion of the rivet or pin 3. The body of the rivet or pin 3 passes through the slot in the bottom of the lug 4 and through a hole formed centrally through the back plate 2, and the expanded heads or ends $3^a$ and $3^b$ of the rivet or pin 3 bear respectively against the bottom wall of the lug 4 and against the under side of the back plate 2, thereby securely holding the parts together.

In forming a brake shoe in accordance with my invention, the attaching lug 4 will preferably be bent to the shape shown and this lug will then be connected to the back 2 by means of the vertical rivet or pin 3 passing through the lug and through the back plate, and the ends of the rivet or pin will be upset so as to securely retain the parts together. Thereafter, the back plate, with the lug in position, will be placed in a suitable mold into which the cast metal, to form the body of the shoe, will be poured.

In the preferred form of my invention, the cast metal forming the body of the shoe will be extended upward to form the abutments $1^a$ at each side of the central fastening lug 4, these abutments $1^a$ preferably extending slightly above and over the crown or top of the lug 4.

While I have described what I regard as the preferred embodiment of my invention, I wish it understood that the details above set forth may be varied without departing from the spirit of the invention.

So far as I am aware, my invention presents the first instance of a brake shoe having a ductile metal lug connected to a ductile metal reinforcing back plate by means of a part projecting from the back plate through a slot formed in the bottom of the lug between its side walls.

Having thus described my invention, what I claim as new and desire to secure by Letters Patent, is—

1. A brake shoe comprising the combination with a cast metal body and a ductile metal reinforcing back, of a ductile metal fastening lug having integral top, sides and bottom, said bottom having a transverse, open-ended slot therein and a part extending up from said reinforcing back through said slot and serving to unite the back and lug together.

2. A brake shoe comprising the combination with a cast metal body and a ductile metal reinforcing back, of a ductile metal fastening lug having integral top, sides and bottom, and a pin or rivet extending through the bottom of said lug between the sides thereof and serving to unite said back and lug together.

3. A brake shoe comprising the combination with a cast metal body and a ductile metal reinforcing back, of a ductile metal fastening lug having an integral top, sides and bottom, the bottom being formed of inwardly turned parts, and a pin or rivet extending through the bottom of said lug and through said ductile metal back and serving to unite said parts together.

4. A brake shoe comprising the combination with a cast metal body and a ductile metal reinforcing back, of a ductile metal fastening lug having an open-ended slot in its bottom, and a pin or rivet extending through the slot of said lug and through said ductile metal back, the ends of said pin or rivet being expanded, and serving to unite said parts together.

BENJAMIN A. JOHNSON.

Witnesses:
GEO. P. FISHER,
J. G. ANDERSON.

Copies of this patent may be obtained for five cents each, by addressing the "Commissioner of Patents, Washington, D. C."